United States Patent
Catherman et al.

(10) Patent No.: US 7,254,722 B2
(45) Date of Patent: *Aug. 7, 2007

(54) TRUSTED PLATFORM MOTHERBOARD HAVING PHYSICAL PRESENCE DETECTION BASED ON ACTIVATION OF POWER-ON-SWITCH

(75) Inventors: Ryan Charles Catherman, Raleigh, NC (US); Steven Dale Goodman, Raleigh, NC (US); James Patrick Hoff, Raleigh, NC (US); Randall Scott Springfield, Chapel Hill, NC (US); James Peter Ward, Raleigh, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 266 days.

This patent is subject to a terminal disclaimer.

(21) Appl. No.: 10/411,415

(22) Filed: Apr. 10, 2003

(65) Prior Publication Data

US 2004/0205070 A1 Oct. 14, 2004

(51) Int. Cl.
*G06F 1/28* (2006.01)
(52) U.S. Cl. .................... 713/300; 726/28
(58) Field of Classification Search ........... 713/170, 713/300; 726/28
See application file for complete search history.

(56) References Cited

U.S. PATENT DOCUMENTS

| | | |
|---|---|---|
| 5,392,438 A | 2/1995 | Gunji |
| 5,613,135 A | 3/1997 | Sakai et al. |
| 5,754,798 A | 5/1998 | Uehara et al. |
| 5,826,015 A * | 10/1998 | Schmidt .................. 726/23 |
| 5,845,136 A * | 12/1998 | Babcock .................. 713/300 |
| 6,647,512 B1 * | 11/2003 | James et al. ................. 714/36 |
| 6,684,338 B1 | 1/2004 | Koo |
| 6,925,570 B2 | 8/2005 | Freeman et al. |
| 2004/0193883 A1 * | 9/2004 | Alperin et al. ............. 713/170 |

FOREIGN PATENT DOCUMENTS

EP 0 973 086 A1 1/2000

OTHER PUBLICATIONS

Advanced Configuration and Power Interface Specification, Revision 2.0a, Chapter 4: ACPI Hardware Specification, Mar. 2002.*
"Trusted Computing Platform Alliance (TCPA),"—Main Specification Version 1.1b, Feb. 22, 2002, pp. 1-322.
"TCG PC Specific Implementation Specification,"—Version 1.00, Sep. 9, 2001, pp. 1-71.
PCT/GB2004/001531 International Search Report.

* cited by examiner

*Primary Examiner*—Chun Cao
*Assistant Examiner*—Albert Wang
(74) *Attorney, Agent, or Firm*—Ference & Associates; Carlos Munoz-Bustamante

(57) ABSTRACT

A motherboard for a computer system is presented which provides a trusted platform by which operations can be performed with an increased level trust and confidence. The basis of trust for the motherboard is established by an encryption coprocessor and by code which interfaces with the encryption coprocessor and establishes root of trust metrics for the platform. The encryption coprocessor is built such that certain critical operations are allowed only if physical presence of an operator has been detected. Physical presence is determined by inference based upon the status of registers in the core chipset on the motherboard.

19 Claims, 3 Drawing Sheets

TRUSTED PLATFORM MOTHERBOARD HAVING PHYSICAL PRESENCE DETECTION BASED ON ACTIVATION OF POWER-ON-SWITCH

BACKGROUND OF THE INVENTION

This invention pertains to circuit board components of computer systems and other information handling systems and, more particularly, to circuit boards for a computer system which is built on a trusted platform such as the TCPA industry standard platform.

There is a need in the computer industry to raise the level of confidence with which users run applications and perform network transactions. This is particularly true for electronic commerce transactions where users key in credit card and other sensitive information. Several solutions have emerged in the industry. One solution, the Smart Card, has emerged as a standard for raising the level of confidence by providing hardware which establishes a trusted user. In the Smart Card solution, the computer system is not the trusted entity. Rather, it is the smart card hardware which is the trusted entity and which is associated with a particular user. Another solution, the Trusted Computing Platform, has emerged as a standard for raising the level of confidence by providing hardware which establishes a trusted platform. With the trusted platform the user is not the trusted entity. Rather, it is the platform which is trusted.

Modern computer systems provide remote power-on capability. For example, the computer can be powered on when the RING signal from an incoming FAX is detected at the computer's modem. The computer can then power-on, boot, and receive the incoming fax. Likewise, the computer can be powered on when local area network activity is detected at its LAN card; it can then boot and respond to any local area network requests. Computers with this capability, however, are particularly at risk while unattended because they are vulnerable to attacks even if they are powered off.

SUMMARY OF THE INVENTION

Briefly, the invention is a motherboard article of manufacture for use in the fabrication of computer systems. The motherboard supports and provides electrical interconnection between a trusted platform module (TPM) and a non-volatile memory which stores program code. The motherboard also includes an unpopulated processor socket which provides connection for a processor. The socket is so arranged that, when the motherboard is used to manufacture a computer system, the provided processor executes the code in the nonvolatile memory. The motherboard also includes a status register which assumes a power-on status state indicating how power was last previously applied. The code, when executed, is effective to read the power-on status state of the status register.

The code then determines if the last application of power was previously initiated by the activation of a power-on switch. The determination is based on the power-on status state as read from the status register. Depending on the result, a command is codified to issue which affects the operation of the TPM.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 3:
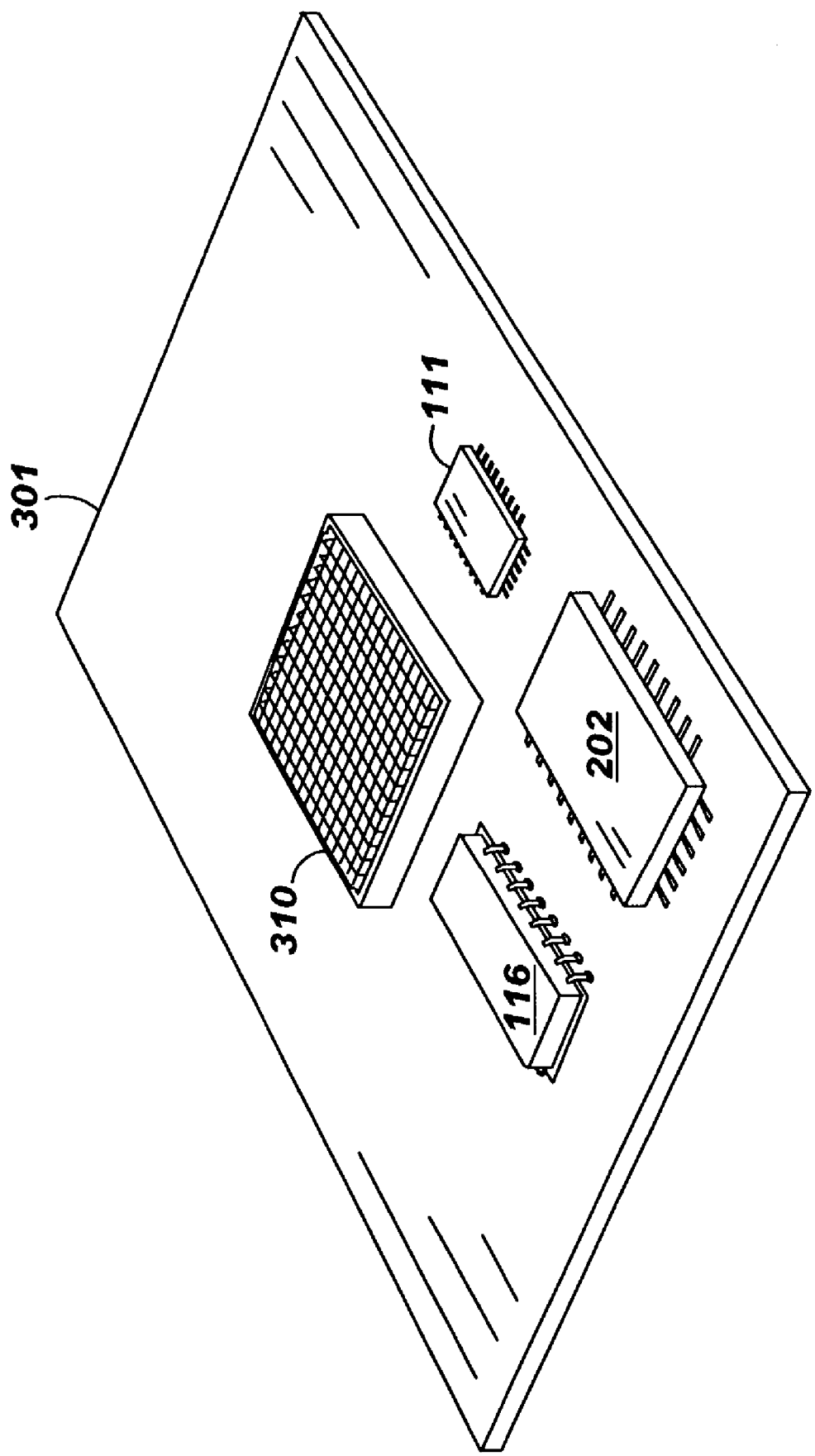
FIG. 3 is a perspective view of the motherboard which supports and provides electrical interconnection for the security components of one embodiment of the present invention.

Referring now to the accompanying drawings, and particularly to FIG. 3, there is illustrated a perspective view of a motherboard 301 or circuit board configured in accordance with an embodiment of the present invention. Motherboard 301 provides mechanical support and electrical interconnection between the TPM 111, the NVRAM 116, a core Southbridge chipset 202, and an unpopulated processor socket 310. This circuit arrangement provides the basis for the manufacture of a trusted system platform which presents and receives information to and from the user. The platform, when manufactured, is composed of the circuit arrangement shown in FIG. 3, a processor or CPU provided at the socket 310, and primary peripheral devices (not shown) attached to the circuit board 301. Primary peripheral devices are considered to be those devices which directly attach to and directly interact with the motherboard 301. Examples are PCI cards, LPC components, USB Host controllers and root hubs, attached serial and parallel ports, etc. However, USB and IEEE 1394 devices are not considered primary peripheral devices.

Figure 1:
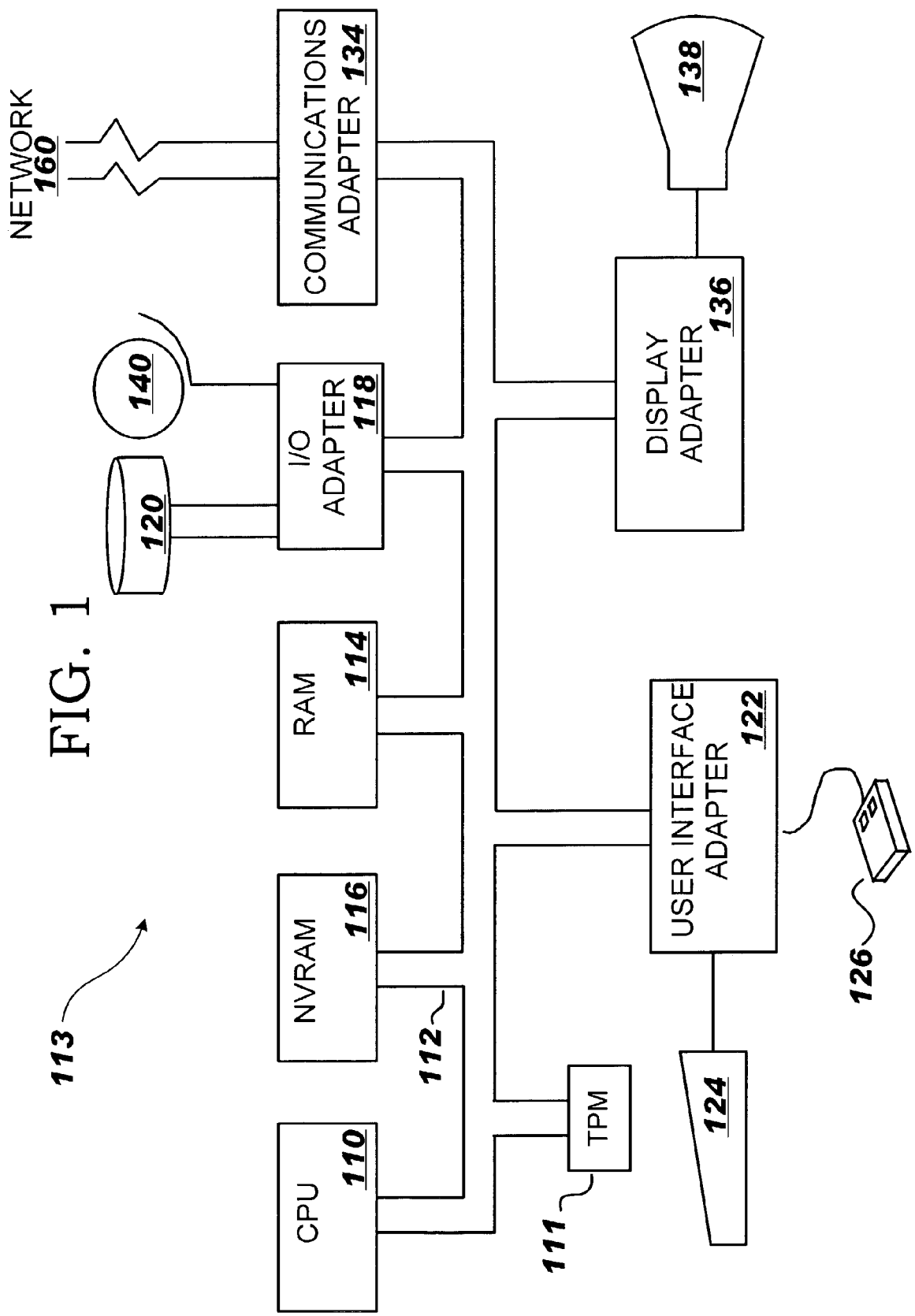
FIG. 1 illustrates the type of computer system which utilizes the motherboard configured in accordance with an embodiment of the present invention.

FIG. 1 illustrates the type of computer system which utilizes the motherboard configured in accordance to the present embodiment. System 113 is provided with a central processing unit (CPU) 110, which is coupled to various other components by system bus 112. The system bus 112 may be a straight bus, or it can be a hierarchal system of buses. A flash nonvolatile random access memory ("NVRAM") 116 is coupled to the system bus 112 and includes a basic input/output system ("BIOS") that controls certain basic functions of the computer system 113.

The function performed by NVRAM 116 of storing the basic input output system is the same as that traditionally performed by a ROM device. The flash device of the present embodiment has the advantage of being field upgradable. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network 160 (e.g., the Internet) enabling the computer system to communicate with other such systems. Input/Output devices are also connected to system bus 112 via user interface adapter 122 and display adapter 136. Keyboard 124 and mouse 126 are all interconnected to bus 112 via user interface adapter 122. Display monitor 138 is connected to system bus 112 by display adapter 136. In this manner, a user is capable of inputting to the system 113 through the keyboard 124 or mouse 126 and receiving output from the system via display 138.

According to the preferred implementation, sets of instructions or program code for executing the methods of the present embodiment are resident in the NVRAM 116. In alternative embodiments, the program code need not reside on NVRAM 116, but can reside on other nonvolatile memories. Until required by a computer system fabricated with the motherboard 301 of the present embodiment, the program code may be stored, for example, in disk drive 120 (which may include a removable memory such as an optical disk or floppy disk for eventual use in the disk drive 120). In these alternative embodiments, regardless of its source, the code executes as the initial code which runs subsequent to any reset event in the computer system. Further, the code can also be stored at another computer and transmitted when desired to the user's workstation by a network or by an external network 160. One skilled in the art would appreciate that the physical storage of the program code physically changes the medium upon which it is stored so that the medium carries computer readable information. The change may be electrical, magnetic, chemical, biological, or some other physical change. While it is convenient to describe the code in terms of instructions, symbols, characters, or the like, the reader should remember that all of these and similar terms should be associated with the appropriate physical elements.

Motherboard 301 is implemented such that the manufacture the Computer system 113 provides a user with a trusted platform upon which certain trusted operations can be performed. The motherboard 301 is constructed in accordance to the Trusted Computing Platform Alliance (TCPA) specification entitled TCPA *Main Specification Version* 1.1b, which is hereby incorporated by reference herein. In the preferred embodiment, motherboard 301 is implemented for a PC architecture system and is further adherent to the TCPA PC *Specific Implementation Specification Version* 1.00 which is also hereby incorporated herein by reference. Trusted platform module (TPM) 111 is a cryptographic processor which provides motherboard 301 with hardware assisted cryptographic capabilities. TPM 111 can be a fully integrated security module designed to be integrated into systems. Any type of cryptographic processor can be utilized. However, in the preferred embodiment, TPM 111 implements version 1.1b of the TCPA specification for Trusted Platform Modules (TPM). The TPM 111 includes an asymmetric encryption co-processor which amongst other things performs key generation, random number generation, digital signature key generation, and hash generation functions. The TPM 111 is capable of computing a RSA signature using CRT and has an Internal EEPROM Storage for storing a predetermined number of RSA Keys. Also included are a set of 20-byte platform configuration registers (PCRs) for establishing the root of trust for the platform. One example of such a TPM device is an Atmel™ part number AT97SC320.

In addition to storing the BIOS code, NVRAM 116 also stores code which is used to perform power on self test (POST) routines. A portion of this POST code is responsible for establishing the root of trust for the platform. Trust is established in the platform by having the NVRAM 116 and TPM 111 physically and/or logically coupled on the motherboard to form a trusted building block. As will be explained in greater detail hereinafter, NVRAM 116 and TPM 111 are assembled on motherboard 301 in such a way that trusted code stored in the NVRAM 116 would gain control of the computer system upon a system reset. This trusted code is known as the Core Root of Trust for Measurement (CRTM). In order to verify that the POST code being run is the code shipped by the manufacturer, the code is arranged on motherboard 301 such that each section—before it is executed—is first sized by the CRTM itself. Each section of code is arranged to be checked for length and check sum, and to create a hash which represents the code being run. Each hash is then stored in one of the 20 byte PCRs within the TPM 111. Verification of these hash values can then be performed by comparing the hash values against published hash values which are published by the manufacturer for verification purposes.

Since it is possible to remotely power-on the computer system, for example by wake on LAN or wake on RING, it is possible to remotely power-on the system and attack it. However, such an attack can be prevented by providing a physical presence detect feature on motherboard 301 which meets the requirements of the TCPA specification. In order to maintain a secure system, the CRTM code is arranged to check for the physical presence of a person upon power-on before certain critical operations can be performed at the computer system. As will be described in further detail as the description of the present embodiment ensues, rather than implementing a physical jumper or switch as directed by the TCPA specification, the motherboard 301 of the present embodiment checks for physical presence by examining the core chipset registers for indication of how the computer was powered on. Based upon this examination, the motherboard 301 of the present embodiment infers the physical presence of a user. When it is inferred that there is no physical presence, the CRTM code interfaces with the TPM 111 in such a way that the TPM 111 from that point on, from that boot on, will refuse certain critical types of TPM transactions. On the other hand, when it is inferred that there is physical presence, certain critical types of TPM transactions are allowed. Avoiding a physical jumper or switch provides the present embodiment with a lower cost of manufacture. Moreover, the lack of a physical jumper or switch allows motherboard 301 to be made without electrical or mechanical uniqueness. This lack of uniqueness, in turn, allows a greater ability to leverage the motherboard 301 in any system sharing the same electrical and mechanical design, thereby further lowering overall costs for the manufacturer.

Figure 2:
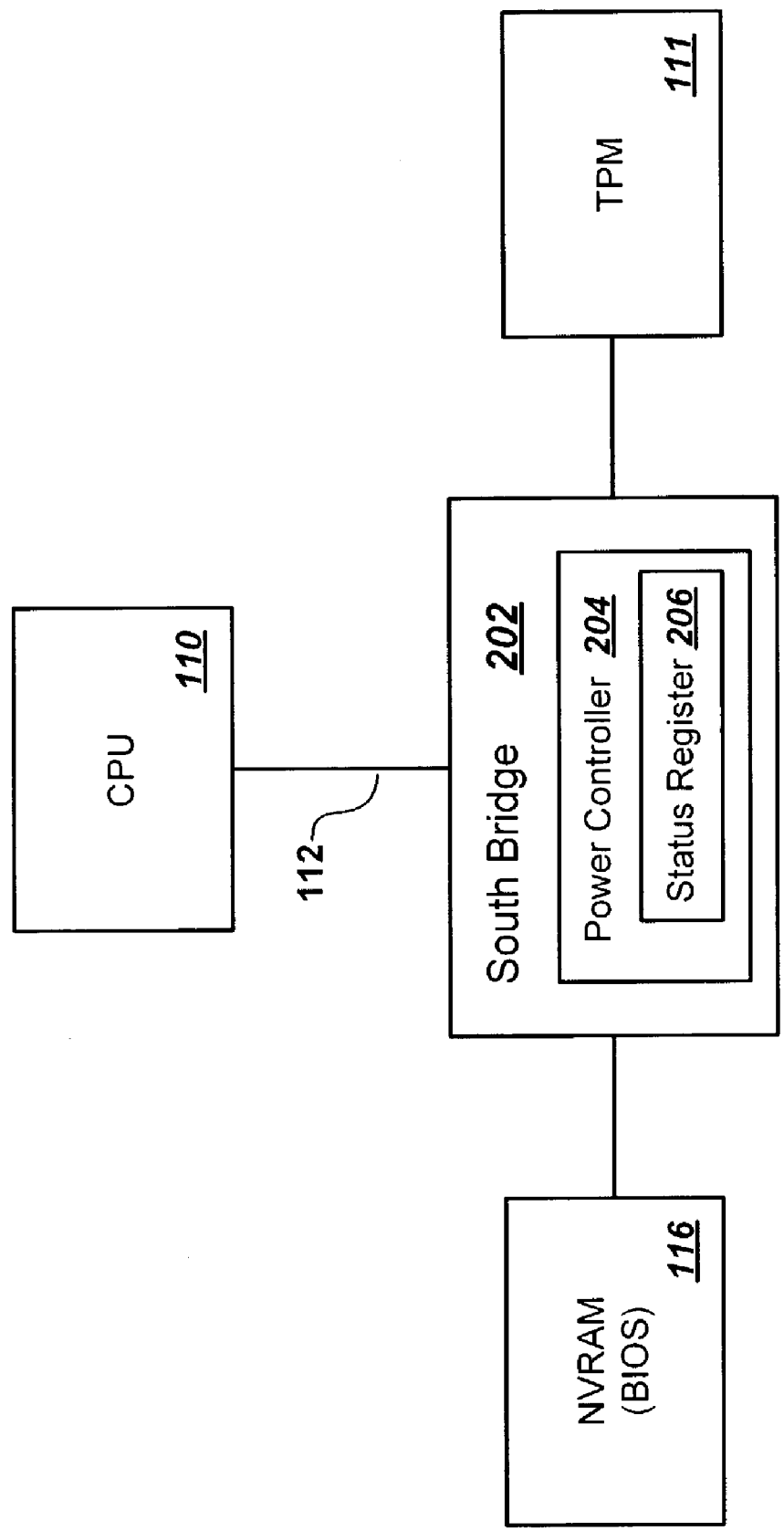
FIG. 2 is a detailed block diagram of the motherboard security components of an embodiment of the present invention.

Referring to FIG. 2 and FIG. 3, the processor 110 provided by the manufacturer of computer system 113 executes the CRTM code stored in the NVRAM 116. As stated previously, this CRTM code interacts with the TPM 111 in such way as to provide a trusted platform. The trusted CRTM code stored in NVRAM 116 and the TPM 111 are the basic components of the trusted platform and are the only trusted components of the platform. When the proper binding is established between the CRTM code and the TPM 111, a basis for trust is established in the platform. The binding of NVRAM 116 and TPM 111 can be physical or logical and is considered to be outside the scope of the present invention. Details concerning the binding of the CRTM to the TPM 111 are well known in the trusted computing art and are omitted so as to not obfuscate the present disclosure in unnecessary detail. In the present embodiment, the CRTM is contained within a portion of NVRAM 116. In another embodiment, however, the CRTM code consumes the entirety of NVRAM 116. Since the CRTM and the TPM 111 are the only trusted components of the platform and since indication of physical presence requires a trusted mechanism to be activated by the platform user, the indication of physical presence is contained within the CRTM code of NVRAM 116 and the TPM 111.

The bus 112 of the preferred embodiment is a hierarchical bus having a north bus bridge (hereinafter "Northbridge," not shown) and a south bus bridge 202 (hereinafter "Southbridge"). The Northbridge encompasses buses which are operationally closer to the processor socket 310, such as memory and caching buses. The Southbridge 202 encompasses buses which are closer to system I/O, such as X-Bus, IDE, LPC, and other buses. Note, however, that the bus 112 of the preferred embodiment need not be implemented as a hierarchical bus. Instead, a flat bus as schematically shown in FIG. 1 can be implemented physically. Alternatively, a hierarchy involving only a single bridge chip may be used. The Southbridge 202 provides an LPC bus which, amongst other components, couples NVRAM 116. The LPC bus is a low pin count bus based on the IBM PCAT bus and forms part of the hierarchical bus 112. The Southbridge 202 also couples the TPM 111. Southbridge 202 also includes a number of low-level system controllers such as an Advanced Configuration and Power Interface (ACPI) compliant power controller 204. ACPI is an industry-standard interface for OS-directed configuration and power management. The ACPI power controller 204 within the Southbridge 202 provides a hardware interface between an operating system and the devices whose power is being controlled. Many of the functions provided by power controller 204 are accessed via registers as either enable or status registers. One such register is status register 206. Status register 206 contains a series of bits each of which gives status as to the power configuration of the machine and as to its current and initial status. In the preferred embodiment, one of the bits, the power switch bit, is reserved to indicate whether power was last applied to the system by the activation of the system power switch housed on the front face of the system. The system power switch can be connected directly to the motherboard 301 or indirectly through the power supply. The system power switch can also be mounted on the power supply directly, although mounting the power switch to the front face is preferred. When the last application of power was applied to the motherboard 301 by the system power switch, the power switch bit is asserted. When the last application of power was applied to the motherboard 301 by other than the system power switch, the power switch bit is de-asserted. Thus, if a system manufactured with motherboard 301 is remotely powered on via wake on LAN or wake on RING events, for example, the power switch bit is de-asserted. In the preferred embodiment the power switch bit is implemented such that it is settable only in hardware and not by software. This is done in order to prevent spoofing by trojan or virus software attempting to breach the security of the platform. Allowing the power switch bit to be reset (set to a deasserted state) by software is considered an acceptable design choice since the de-assertion of the power switch bit after the operating system loads is ignored, and even if not ignored software de-assertion of the power switch bit would otherwise serve to to increase the level of security in the system. In the preferred embodiment, the power switch bit indicates whether the application of power by the system power switch was initiated at the time of the last power-on event. In an alternative embodiment, the power switch bit can be designed to indicate whether the system power switch has been depressed. In the latter case, the software which makes the determination must run sooner or otherwise take other measures to make a trusted determination.

As has been stated, Motherboard 301 is constructed such that a processor provided on socket 310, such as processor 110 shown in the exemplary system 113, preferably executes the CRTM code stored in NVRAM 116 as the initial code that executes after a system reset. The motherboard 301 enters the reset state from either a hardware or software reset event. The hardware reset state is entered upon the application of power or it can be entered via a dedicated system reset switch. In the preferred embodiment, the CRTM code is given initial control in order to establish trust in the platform. Once the CRTM code executes, the CRTM interacts with the TPM 111 in order to establish the root of trust for the platform. As described previously herein, the CRTM code verifies itself through the use of the hashing functions and PCR registers of the TPM 111. In addition and amongst other things, the CRTM code reads the status register 206 for the current state of the power switch bit. The CRTM code then makes an inference as to the presence or absence of a user at the machine and based on this inference issues a command to the TPM 111 to either limit or allow certain critical TPM functions.

When the power switch bit of status register 206 is found to be in an asserted state, an inference is made that a user is present at the machine. In this case, the issued command allows a predetermined set of functions to execute at the TPM 111. In the preferred embodiment, the issued command is a command which sets a physical presence flag in TPM 111. The TPM 111 is then implemented to only allow certain functions when physical presence is indicated as per the physical presence flag. An example of such a command is a command which resets the TPM 111 to its factory default state. Such a command can only be accepted and executed by TPM 111 if physical presence has been determined.

Conversely, when the power switch bit of status register 206 is found to be in an de-asserted state, an inference is made that a user is not present at the machine. In this case, the issued command blocks a predetermined set of functions to execute at the TPM 111. In the preferred embodiment, the issued command is a command which resets the physical presence flag in TPM 111 following the determination indicating lack of physical presence. The TPM 111 is then implemented to limit certain functions when physical presence is not indicated as per the physical presence flag. Given this set of circumstances, the exemplary command which attempts to reset the TPM 111 to its factory default state would be blocked by TPM 111 since no physical presence is indicated.

For the most part, details concerning which commands are limited and which commands are allowed by the TPM 111 have been omitted in as much as such details are not necessary to obtain a complete understanding of the present invention and are within the skills of persons of ordinary skill in the relevant art. Otherwise, a reader of arbitrary skill who is interested in details concerning the commands is otherwise directed toward the TCPA specifications incorporated by reference which present such details.

In an alternative embodiment, in addition to setting or resetting the physical presence flag in TPM 111, an additional command is issued which sets a physical presence lock flag in TPM 111. TPM 111 is then implemented such that the value of the physical presence flag is not changeable once the physical presence lock flag has been set. The locking of the physical presence flag has a lifetime which extends to the next platform reset.

Regardless of whether the physical presence flag is locked by the mechanism of the lock flag or by some other binding mechanism, once all of the CRTM metrics have been documented in the hash tables of the TPM 111 PCR's and once physical presence or lack thereof has been established at the TPM 111, the platform is thereafter considered to be trusted and secured to the extent determined. After platform trust has been established, control can then be passed to non-secure code.

In one embodiment of the present invention, control is then passed to nonsecure POST code residing within NVRAM 116. In this embodiment, the code which is given control after the platform is secured is code which accesses any computer system I/O device such as a keyboard device, a video device, or a pointing device.

In another embodiment, the CRTM code is considered to be the entirety of code stored within NVRAM 116. In this embodiment, control is then passed to nonsecure code stored in other than the NVRAM 116. Generally, this would be code which loads the operating system. In a motherboard for an IBM PC compatible computer system, the loading of the operating system is typically instantiated by the execution of a software INT 19 executed as the last instruction stored within the NVRAM 116. However, one of ordinary skill in the art is able to use other methods to load the operating system and any method used would not depart from the spirit and scope of the present invention.

In the drawings and specifications there has been set forth a preferred embodiment of the invention and, although specific terms are used, the description thus given uses terminology in a generic and descriptive sense only and not for purposes of limitation.

We claim as our invention:

1. A motherboard comprising:
   a circuit board having an unpopulated processor socket and a status register which assumes a power-on status state which indicates how the application of power to said circuit board was last previously initiated;
   a trusted platform module (TPM) mounted on said circuit board; and
   a nonvolatile memory mounted on said circuit board and coupled thereby to said TPM and having computer readable program code stored therein;
   the code stored in said nonvolatile memory being effective when executing to:
     read the power-on status state of the status register;
     determine whether the application of power to said circuit board was last previously initiated by the activation of a power-on switch coupled to said circuit board based on the power-on status state as read from the status register; and
     issue a command which affects the operation of said TPM as a function of the determined power-on state.

2. The motherboard of claim 1 wherein the status register which indicates that power was applied by activation of the power-on switch is settable only in hardware.

3. The motherboard of claim 1 wherein the code which is effective to read, determine, and issue is executed after a reset event and prior to the execution of code which is stored in other than said nonvolatile memory.

4. The motherboard of claim 1 wherein the code which is effective to read, determine, and issue is executed after a reset event and prior to the execution of code which loads the operating system.

5. The motherboard of claim 4 wherein the code which loads the operating system is a first instance of an INT 19h following the reset event.

6. The motherboard of claim 3 wherein the reset event is an event selected from the group consisting of a hardware initiated reset and a software initiated reset.

7. The motherboard of claim 3 wherein the code stored in said nonvolatile memory is further effective when executing to:
   set a physical presence flag in said TPM.

8. The motherboard of claim 7 wherein the code stored in said nonvolatile memory is further effective when executing to:
   set a physical presence lock flag in said TPM.

9. The motherboard of claim 1 wherein the code which is effective to read, determine, and issue is executed subsequent to a reset event and prior to any execution of code which accesses a computer system I/O device, wherein the computer system I/O device is a device selected from the group consisting of a keyboard device, a video device, and a pointing device.

10. The motherboard of claim 1 wherein the issued command limits the operation of said TPM in response to a determination that the power-on switch was not activated in the last previously initiated application of power based on the power-on status state as read from the status register.

11. The motherboard of claim 1 wherein the issued command allows a predetermined trusted operation to execute in said TPM in response to a determination that the power-on switch was activated in the last previously initiated application of power based on the power-on status state as read from the status register.

12. A motherboard comprising:
   a trusted platform module (TPM);
   a nonvolatile memory having computer readable program code stored therein; and
   a circuit board which couples said TPM and said nonvolatile memory and having an unpopulated processor socket and a status register which is settable only in hardware and assumes a power-on status state which indicates how the application of power to said circuit board was last previously initiated;
   wherein said nonvolatile memory is configured on said circuit board so as to execute code stored therein as the initial code executed in response to a reset event, the code being effective when executing to:
     read the power-on status state of the status register;
     determine whether the application of power to said circuit board was last previously initiated by the activation of a power-on switch coupled to said circuit board based on the power-on status state as read from the status register; and
     configure a physical presence flag in said TPM to indicate lack of physical presence in response to a determination that the power-on switch was not activated;
   wherein the code which is effective to read, determine, and configure executes before the execution of code which is stored in other than said nonvolatile memory, and wherein operation of said TPM is limited as a function of the configured physical presence flag.

13. The motherboard of claim 12 wherein the code stored in said nonvolatile memory is further effective when executing to:
   lock the physical presence flag in said TPM by setting a physical presence lock flag in said TPM;
   wherein the code locks the physical presence flag before the execution of code which is stored in other than said nonvolatile memory.

14. The motherboard of claim 13 wherein the execution of code which is stored in other than said nonvolatile memory is code which loads the operating system and wherein the reset event is an event selected from the group consisting of a hardware initiated reset and a software initiated reset.

15. The motherboard of claim 14 wherein the code which loads the operating system is a first instance of an INT 19h following the reset event.

16. A motherboard comprising:
   a trusted platform module (TPM);
   a nonvolatile memory having computer readable program code stored therein; and
   a circuit board which couples said TPM and said nonvolatile memory and having an unpopulated processor socket and a status register which is settable only in hardware and assumes a power-on status state which indicates how the application of power to said circuit board was last previously initiated;
   wherein said nonvolatile memory is configured on said circuit board so as to execute code stored therein as the initial code executed in response to a reset event, the code being effective when executing to:
      read the power-on status state of the status register;
      determine whether the application of power to said circuit board was last previously initiated by the activation of a power-on switch coupled to said circuit board based on the power-on status state as read from the status register; and
      configure a physical presence flag in said TPM to indicate physical presence in response to a determination that the power-on switch was activated;
   wherein the code which is effective to read, determine, and configure executes before the execution of code which is stored in other than said nonvolatile memory, and wherein a predetermined trusted operation is allowed to execute in said TPM as a function of the configured physical presence flag.

17. The motherboard of claim 16 wherein the code stored in said nonvolatile memory is further effective when executing to:
   lock the physical presence flag in said TPM by setting a physical presence lock flag in said TPM;
   wherein the code locks the physical presence flag before the execution of code which is stored in other than said nonvolatile memory.

18. The motherboard of claim 17 wherein the execution of code which is stored in other than said nonvolatile memory is code which loads the operating system and wherein the reset event is an event selected from the group consisting of a hardware initiated reset and a software initiated reset.

19. The motherboard of claim 18 wherein the code which loads the operating system is a first instance of an INT 19h following the reset event.

* * * * *